United States Patent [19]

Suzuki

[11] Patent Number: 4,510,764
[45] Date of Patent: Apr. 16, 1985

[54] CONTROL METHOD FOR AIR CONDITIONING SYSTEMS FOR VEHICLES

[75] Inventor: Nobuhiko Suzuki, Konan, Japan

[73] Assignee: Diesel Kiki Co., Ltd., Saitama, Japan

[21] Appl. No.: 555,475

[22] Filed: Nov. 28, 1983

[30] Foreign Application Priority Data

Dec. 3, 1982 [JP] Japan .................. 57-212530

[51] Int. Cl.³ ............................................. B60H 3/04
[52] U.S. Cl. ....................................... 62/133; 62/163; 62/228.5; 62/243
[58] Field of Search ................. 62/133, 163, 161, 213, 62/215, 226, 230, 243, 244, 228.4, 228.5, 323.1, 323.4; 165/43

[56] References Cited

U.S. PATENT DOCUMENTS 4,155,225  5/1979  Upchurch, Jr. ............... 62/323.1 X
4,359,875  11/1982 Ohtani ..................... 62/133
4,424,682  1/1984  Miska et al. ............... 62/133
4,425,765  1/1984  Fukushima et al. .......... 62/133

FOREIGN PATENT DOCUMENTS 47-981     1/1972  Japan .
51-23163   6/1976  Japan .
87712      6/1982  Japan ..................... 62/133
191118    11/1982  Japan ..................... 62/133

Primary Examiner—Harry Tanner
Attorney, Agent, or Firm—Frishauf, Holtz, Goodman and Woodward

[57] ABSTRACT

A control method for an air conditioning system for a vehicle, which is driven by an engine installed on the vehicle. The control method comprises selecting either a first control manner of controlling the air conditioning system so as to preferentially ensure required driveability of the engine, or a second control manner of controlling the air conditioning system so as to preferentially ensure required cooling capacity of the system, and controlling the air conditioning system in accordance with the selected control manner.

7 Claims, 4 Drawing Figures

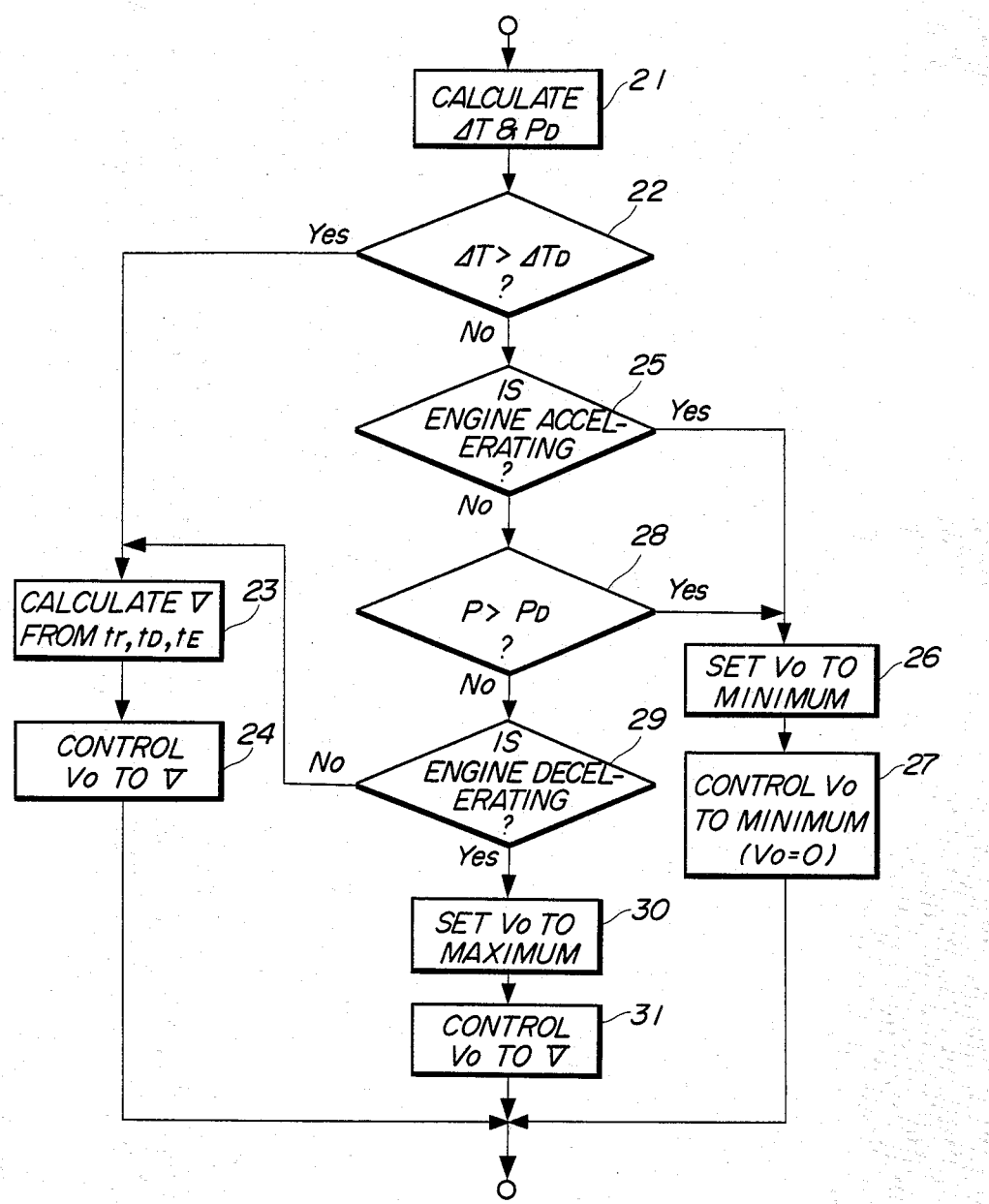

CONTROL METHOD FOR AIR CONDITIONING SYSTEMS FOR VEHICLES

BACKGROUND OF THE INVENTION

This invention relates to a control method for controlling the operation of an air conditioning system for use in a vehicle, and more particularly to a control method of this kind which affords selection of desired one of a driveability-preceding control mode and a cooling capacity-preceding control mode to be applied to control of the system.

In air conditioning systems for use in vehicles, the compressor is driven by the engine of the vehicle. Therefore, the operation of the air conditioning system causes an increased load on the engine, which results in a drop in the output of the engine. Consequently, the engine can show degraded accelerability or output shortage during acceleration or during high load operation. To avoid such phenomena, it has conventionally been employed to interrupt the operation of the compressor of the air conditioning system or control the delivery quantity, i.e. per-rotation volumetric throughput of the compressor to a minimum value if it is a variable delivery type, during acceleration or high load operation of the engine, so as to avoid application of a large load on the engine on such an occasion, as proposed by Japanese Utility Model Publications No. 47-981 and No. 51-23163. On the other hand, some air conditioning systems have employed a cooling capacity-preceding control method in which the above-mentioned interruption of the operation of the compressor or reduction of the delivery quantity of the compressor to a minimum value is effected only when the thermal load on the air conditioning system such as the car compartment temperature becomes less than a predetermined value. Such a cooling capacity-preceding control method has been proposed by Japanese Provisional Patent Publication No. 57-58032.

However, according to these conventional control methods, the control of the air conditioning system is carried out irrespective of the driver or passenger(s)'s will or desire. Therefore, those who make much of the cooling capacity, preferring that a comfortable riding space should be obtained even if the driveability is somewhat sacrificed, will feel uncomfortable when the driveability-preceding control method is applied wherein the compressor of the air conditioning system is interrupted or has its delivery quantity reduced to a minimum value. On the contrary, those who make much of the driveability, preferring that satisfactory accelerability or slope-ascending ability of the engine should be maintained even if the cooling capacity is somewhat sacrificed, will feel disatisfied when the cooling capacity-preceding control method is applied in controlling the air conditioning system. Thus, there are contradictory desires of the users.

SUMMARY OF THE INVENTION

It is the object of the invention to provide a control method for air conditioning systems for vehicles, which affords the driver or the passenger(s) selection of desired one of a driveability-preceding control mode and a cooling capacity-preceding control mode to control the operation of the air conditioning system, at his will, depending upon his preference.

The present invention provides a method of controlling the operation of an air conditioning system for a vehicle, which comprises the steps of: setting a first control manner of controlling the delivery quantity of the compressor in response to operating conditions of the engine, in a manner irrespective of thermal load conditions of the air conditioning system, for preferential achievement of required driveability of the engine; setting a second control manner of controlling the delivery quantity of the compressor in response to thermal load conditions of the air conditioning system, in a manner irrespective of operating conditions of the engine, for preferential achievement of required cooling capacity of the air conditioning system; selecting one of the first control manner and the second control manner; and controlling the air conditioning system in accordance with the control manner selected above.

The above and other objects, features and advantages of the invention will be more apparent from the ensuing detailed description taken in conjunction with the accompanying drawings.

BRIEF DESCRIPTION OF THE DRAWINGS

FIG. 3 is a flow chart of an example of the cooling capacity-preceding control mode employed in the control method according to the invention.

DETAILED DESCRIPTION

Figure 1:
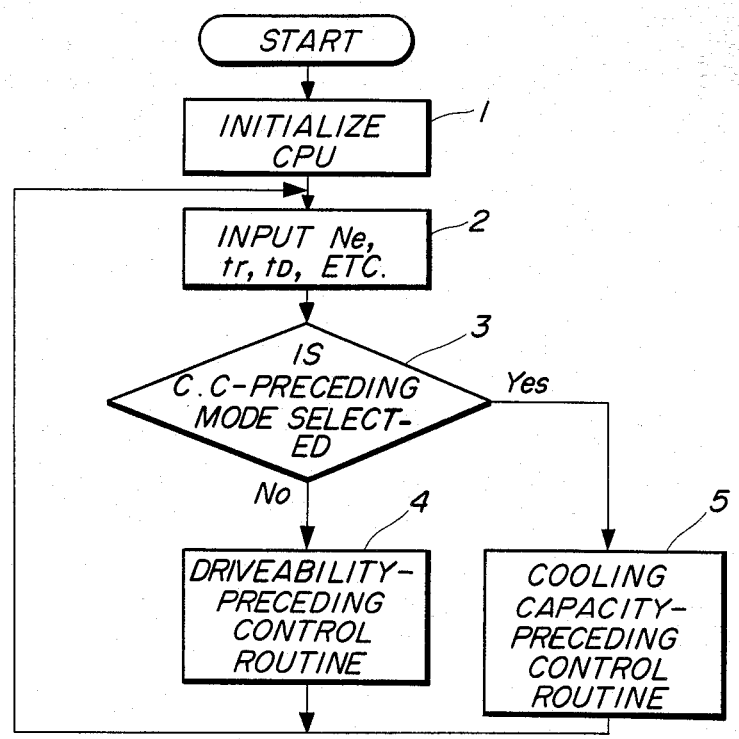
FIG. 1 is a flow chart of an embodiment of the control method for air conditioning systems for vehicles, according to the invention.

Referring first to FIG. 1, there is shown an embodiment of the control method for an air conditioning system for a vehicle, according to the invention. When the power supply of the air conditioning system is turned on, a central processing unit (CPU) of a microcomputer is initialized at the step 1. Then, signals indicative of values of various parameters are inputted to the CPU, which include the engine rpm Ne, the car compartment temperature tr, and a preset value tD of the car compartment temperature, at the step 2. Then, it is determined at the step 3 whether a driveability-preceding control mode or a cooling capacity-preceding control mode has been selected by the driver, etc. Depending upon the results of this determination, the program proceeds to a driveability-preceding control routine at the step 4 or a cooling capacity-preceding control routine at the step 5.

Figure 2:
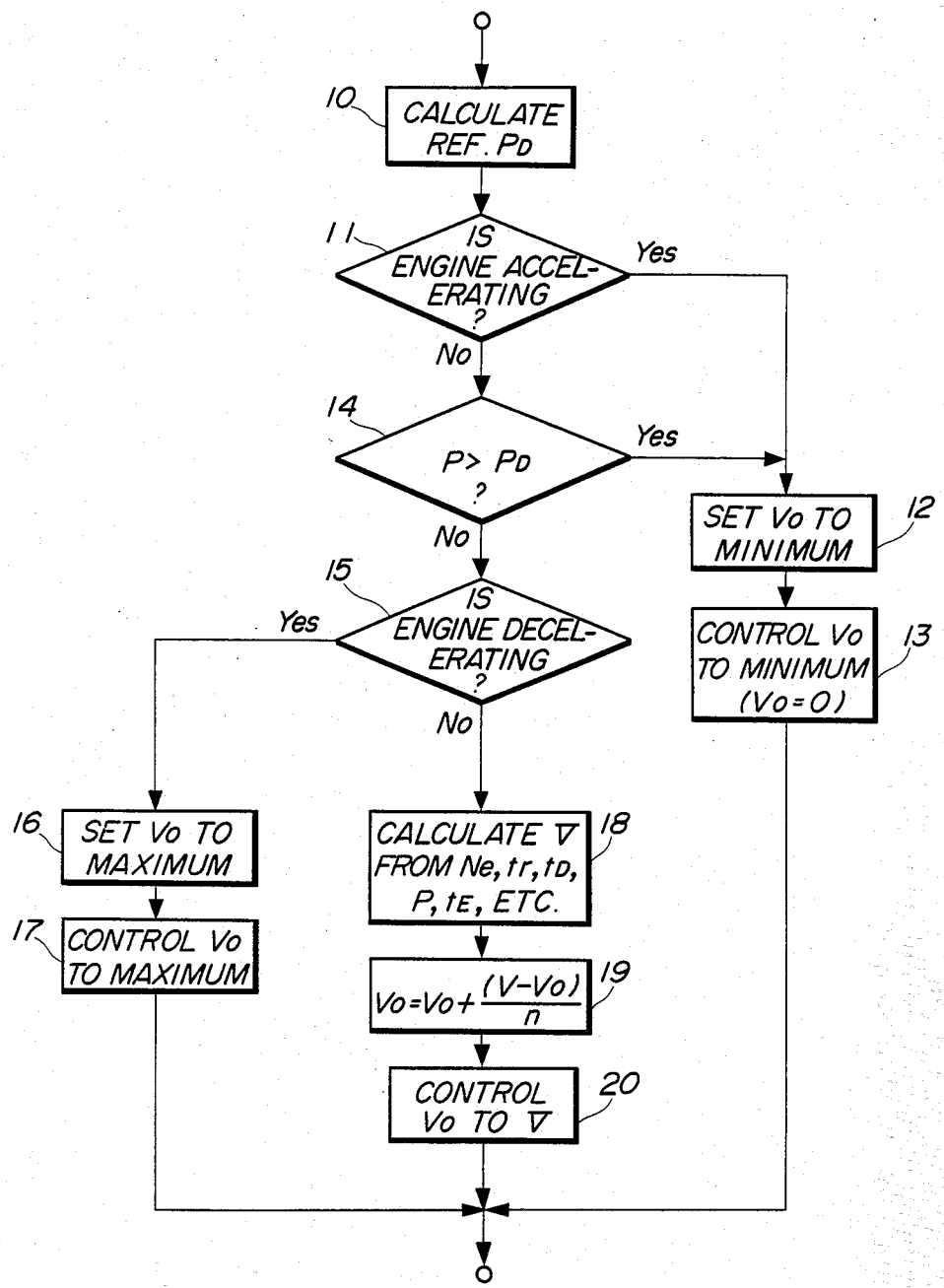
FIG. 2 is a flow chart of an example of the driveability-preceding control mode employed in the control method according to the invention.

The driveability-preceding control routine at the step 4 in FIG. 1 is shown in FIG. 2, by way of example. First, a predetermined reference value PD of intake pressure P particular to the engine applied is set through calculation at the step 10, as a criterion for determination of the engine load. It is determined at the step 11 whether or not the engine is operating in an accelerating condition. If the engine is accelerating, the delivery quantity, i.e. per-rotation volumetric throughput Vo of the compressor is set to a predetermined minimum value, for reduction of the engine load, at the step 12. The compressor is controlled by a command from the CPU to the above set predetermined minimum value, at the step 13. If the engine is not accelerating as a result of the determination at the step 11, the actual intake pressure P is compared with the above predetermined reference value PD at the step 14 to determine whether or not the engine is operating in a high load condition. If the engine is found to be operating in such a high load condition, the program proceeds to the step 12 again wherein the delivery quantity of the compressor is set to and controlled to the predetermined minimum value to thereby reduce the load on the engine. On the other hand, if the answer to the question of the step 14 is negative, that is, if the engine is not operating in a high load condition, it is then determined at the step 15 whether or not the engine is in a decelerating condition.

If the engine is found to be decelerating at the step 15, the CPU sets the delivery quantity Vo of the compressor to a predetermined maximum value, at the step 16, and accordingly the compressor has its delivery quantity controlled to the thus set maximum value at the step 17, to thereby increase the load on the engine for enhancement of the engine braking effect. If the answer to the question of the step 15 is negative, that is, if the engine is in an normally operative condition such as a cruising condition, the CPU calculates a value of the delivery quantity Vo of the compressor required for bringing the car compartment temperature tr to a preset temperature tD, on the basis of values of various parameter signals indicative, e.g. of the engine rpm Ne, the car compartment temperature tr, the preset car compartment temperature value tD, the intake pressure P, and the temperature tE of fins of the evaporator of the air conditioning system, and adapts this calculated value V as a target value V, at the step 18. Then, the calculations of the delivery quantity Vo are repeatedly effected to gradually vary the same delivery quantity toward the target value Vo, at the step 20. To be specific, the calculations at the step 19 may be effected in the following manner, for instance: A difference (V−Vo) between the target value V of the delivery quantity of the compressor and the actual value Vo is calculated, and the difference (V−Vo) thus obtained is divided by a predetermined value n (>1) to obtain a quotient (V−Vo)/n as an increment or a decrement. This small value (V−Vo)/n is added to the present actual value Vo to obtain a value V' (=Vo+(V−Vo)/n), and the delivery quantity Vo is controlled to this value V'. Then, the small value (V−Vo)/n is added to the above value V' to obtain a value V'' (=V'+(V−Vo)/n), and the delivery quantity is controlled to this value V''. This manner of control is repeatedly effected so as to gradually vary the delivery quantity of the compressor so that the value (V−Vo)/n becomes zero, to thereby finally control the delivery quantity to the target value V. The above calculations of the values (V−Vo), (V−Vo)/n are effected at suitable time intervals. By thus controlling the delivery quantity to the target value in a manner gradually varying the actual delivery quantity, it is possible to avoid shocks applied to the driver and/or the passenger(s), which would otherwise be caused by large changes in the engine load due to abrupt changes in the delivery quantity of the compressor.

As stated above, when the driveability-preceding control mode is selected, the delivery quantity of the compressor is set to and controlled to a predetermined minimum value, e.g. zero, irrespective of the thermal load condition such as the car compartment temperature, if the engine is accelerating or in a high load condition such as running up a slope, to thereby reduce the engine load, whereas at deceleration of the engine, the delivery quantity of the compressor is set to and controlled to a predetermined maximum value to thereby enhance the engine braking effect. Thus, a degradation in the driveability of the engine or the vehicle can be prevented. During control under this driveability-preceding control mode, if the engine is in a normally operative or not a high load condition such as a cruising condition, the delivery quantity of the compressor is controlled so as to maintain the car compartment temperature at a desired or preset temperature. On this occasion, the compressor delivery quantity is controlled in a gradually varying manner so as to avoid shocks applied to the driver, etc. as caused by sudden changes in the engine load due to sudden changes in the delivery quantity.

On the other hand, the cooling capacity-preceding control routine is shown in FIG. 3, by way of example. A difference $\Delta T$ between the actual car compartment temperature tr and a preset value tD of same is calculated, and a predetermined reference value PD of the intake pressure P particular to the engine applied is calculated and set at the step 21. The calculated temperature difference $\Delta T$ is compared with an allowable maximum temperature difference $\Delta TD$ to determine whether or not the relationship $\Delta T > \Delta TD$ stands, at the step 22. If the temperature difference $\Delta T$ is larger than the allowable maximum temperature difference $\Delta TD$, a calculation is made of a value V of the delivery quantity of the compressor required for achieving the preset car compartment temperature tD, on the basis of values of various parameter signals indicative, e.g. of the car compartment temperature tr, the preset car compartment temperature value tD, and the temperature tE of the evaporator fins, at the step 23. The delivery quantity of the compressor is set to and controlled to this calculated value V at the step 24. If the determination of the step 22 gives a negative answer, that is, if the temperature difference $\Delta T$ is smaller than the allowable maximum temperature difference $\Delta TD$, it is determined at the step 25 whether or not the engine is in an accelerating condition. If the answer is yes, the delivery quantity of the compressor is set to a predetermined minimum value, e.g. zero, at the step 26, and it is controlled to this set minimum value at the step 27, to thereby reduce the engine load. If the answer to the question of the step 25 is negative, the actual intake pressure P is compared with the aforementioned reference value PD to determine whether or not the relationship P>PD stands, that is, whether or not the engine is operating in a high load condition, at the step 28.

If the engine is found to be operating in a high load condition as a result of the determination at the step 28, the program proceeds to the step 26 wherein the delivery quantity Vo of the compressor is controlled to the predetermined minimum value, e.g. zero to reduce the engine load. If the answer to the question of the step 28 is negative, it is determined at the step 29 whether or not the engine is in a decelerating condition. If the answer to the question of the step 29 is yes, that is, if the engine is decelerating, the delivery quantity Vo of the compressor is set to a predetermined maximum value at the step 30, and it is controlled to this set maximum value at the step 31 to thereby increase the engine load so as to enhance the engine braking effect. If the answer to the question of the step 29 is negative, that is, if the engine is found to be in a cruising condition, the program proceeds to the step 23 wherein the required value V of the delivery quantity is calculated in the aforestated manner, and the delivery quantity of the compressor is controlled to this calculated value V at the step 24.

As stated above, when the cooling capacity-preceding control mode is selected, the delivery quantity of the compressor is controlled so as to bring the car compartment temperature to a desired value, in a manner irrespective of operating conditions of the engine such as engine load, acceleration and deceleration. Thus, the air conditioning control is effected so as to obtain a comfortable compartment space. Only when the car compartment temperature lies within a desired temperature value range, control of the compressor delivery quantity is effected in response to operating conditions of the engine so as to maintain required driveability of the engine or the vehicle. According to the cooling capacity-preceding control mode, when the engine is in a cruising condition, the compressor delivery quantity is not controlled in such a manner gradually varying the same delivery quantity, as distinct from the step 9 of the aforestated driveability-preceding control routine.

Figure 4:
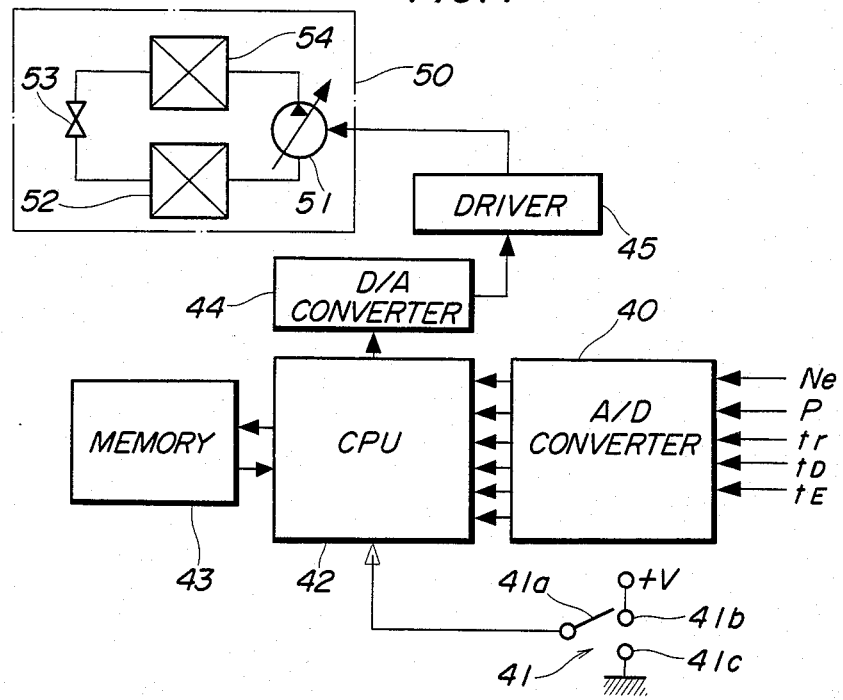
FIG. 4 is a block diagram of an example of an air conditioning system to which is applied the control method of the invention.

FIG. 4 illustrates an example of the air conditioning system to which is applied the control method according to the invention. Various parameter signals indicative, e.g. of the engine rpm Ne, the intake pressure P, the car compartment temperature tr, the preset car compartment temperature value tD, and the evaporator fin temperature tE, are supplied, respectively, from an engine rpm sensor, a pressure sensor for sensing the intake pressure (intake pipe absolute pressure) of the engine, a temperature sensor for sensing the car compartment temperature, a car compartment temperature adjuster, and a temperature sensor for sensing the fin temperature of the evaporator of the air conditioning system, none of which are shown. These parameter signals are successively applied to an analog-to-digital (A/D) converter 40 within a microcomputer, wherein they are converted into respective corresponding digital signals. These digital signals are then supplied to a central processing unit (CPU) 42 within the microcomputer.

The microcomputer includes a memory 43 which stores a driveability-preceding control routine as shown in FIG. 2 and a cooling capacity-preceding control routine as shown in FIG. 3.

A mode-selecting switch 41 is provided to selectively set the air conditioning system to the driveability-preceding control mode and the cooling capacity-preceding control mode, and comprises a movable contact 41a connected to a selecting terminal of the CPU 42, a fixed contact 41b connected to the output of a constant voltage-regulated power supply +V, and a fixed contact 41c grounded. The mode-selecting switch 41 is mounted on a control panel in the car compartment to be operated by the driver.

An digital-to-analog (D/A) converter 44 has its input connected to the output of the CPU 42, and its output connected to the input of a driver circuit 45 for driving a compressor 51 which is a variable delivery type, and which is electrically connected to the output of the driver circuit 45.

The air conditioning system 50 is comprised of the above compressor 51 connected to the output shaft of an engine installed on a vehicle, for compressing refrigerant gas, a condenser 52 for cooling the high pressure refrigerant gas compressed by the compressor 51, into a liquefied state, an expansion valve 53 for regulating the flow rate of the liquefied refrigerant to a proper value corresponding to the thermal load on the air conditioning system, and an evaporator 54 for evaporating the liquefied refrigerant supplied from the expansion valve for cooling air to be discharged into the car compartment through heat exhange of the evaporating refrigerant with the air.

With the above arrangement, to set the air conditioning system to the driveability-preceding control mode, the mode-selecting switch 41 is switched to the fixed contact 41b. On this occasion, the output from the movable contact 41a assumes a high level "1" which is applied to the selecting terminal of the CPU 42. Consequently, the CPU 42 executes the step 3 in FIG. 1 by selecting the driveability-preceding control routine or the cooling capacity-preceding control routine, depending upon the level of the signal from the mode-selecting switch 41 and applied to its selecting terminal. That is, if the signal assumes a high level "1", the driveability-preceding control routine is selected, whereas if the signal assumes a low level "0", the cooling capacity-preceding control routine is selected. Therefore, when supplied with a high level signal from the mode-selecting switch 41, the CPU 42 selects the driveability-preceding control routine, and processes the aforementioned parameter signals supplied thereto through the A-D converter 40, in accordance with the selected driveability-preceding control routine, and generates the resulting control signal for control of the operation of the compressor 51.

On the other hand, to set the air conditioning system to the cooling capacity-preceding control mode, the mode-selecting switch 41 is switched to the fixed contact 41c so that the output from the movable contact 41a assumes a low level "0". Consequently, the CPU 42 selects the cooling capacity-preceding control routine and processes the aforementioned parameter signals supplied from the A-D converter 40 in accordance with the selected cooling capacity-preceding control routine, to generate the resulting control signal for control of the compressor 51.

The D-A converter 44 converts the digital control signal supplied from the CPU 42 into a corresponding analog signal and applies same to the driver circuit 40. The driver circuit 40 operates on this analog control signal to generate a driving signal to thereby control the operation of the compressor 51 so as to control its delivery quantity Vo.

As set forth above, according to the control method of the invention, merely by operating the mode-selecting switch 50 at the driver's will, the air conditioning system can be selectively set to the driveability-preceding control mode and the cooling capacity-preceding control mode.

While a preferred embodiment of the invention has been described, variations thereto will occur to those skilled in the art within the scope of the present inventive concepts which are delineated by the following claims.

What is claimed is:

1. A method for controlling an air conditioning system for a vehicle, including a compressor of a variable delivery type disposed to be driven by an engine installed in said vehicle, for compressing refrigerant, a condenser for cooling said refrigerant compressed by said compressor into a liquefied state, an expansion valve for regulating the flow rate of said liquefied refrigerant to a proper value corresponding to a thermal load on said air conditioning system, and an evaporator for evaporating said liquefied refrigerant supplied from said expansion valve, for cooling air to be discharged from said air conditioning system through heat exchange of said refrigerant being evaporated with said air, the method comprising the steps of:

(a) setting a first control manner of controlling the delivery quantity of said compressor in response to operating conditions of said engine, in a manner irrespective of thermal load conditions of said air conditioning system, for preferential achievement of required driveability of said engine;

(b) setting a second control manner of controlling the delivery quantity of said compressor in response to thermal load conditions of said air conditioning system, in a manner irrespective of operating conditions of said engine, for preferential achievement of required cooling capacity of said air conditioning system;

(c) selecting one of said first control manner and said second control manner; and (d) controlling said air conditioning system in accordance with said selected one of said first and second control manners;

said first control manner comprising the steps of: (i) detecting operating conditions of said engine; (ii) controlling the delivery quantity of said compressor to a predetermined minimum value when said engine is in a first predetermined operating condition wherein a high engine output is required; (iii) controlling the delivery quantity of said compressor to a predetermined maximum value when said engine is in a second predetermined operating condition wherein a low engine output suffices; and (iv) calculating a value of the delivery quantity of said compressor appropriate to a third operating condition of said engine other than said first and second predetermined operating conditions and required for achieving a desired value of the temperature of a compartment in said vehicle and controlling the delivery quantity of said compressor to said calculated value in a manner gradually varying the delivery quantity of said compressor toward said calculated value, when said engine is in said third operation condition.

2. A method as claimed in claim 1, wherein said first predetermined operating condition includes an accelerating condition and a high load condition of said engine.

3. A method as claimed in claim 1, wherein said second predetermined operating condition includes a decelerating condition of said engine.

4. A method as claimed in claim 1, wherein said second control manner comprises the steps of: (i) sensing the temperature of a compartment in said vehicle; (ii) detecting operating conditions of said engine; (iii) controlling the delivery quantity of said compressor to a predetermined minimum value when said compartment temperature lies within a predetermined range and at the same time said engine is in a first predetermined operating condition wherein a high engine output is required; (iv) controlling the delivery quantity of said compressor to a predetermined maximum value when said compartment temperature lies within said predetermined range and at the same time said engine is in a second predetermined operating condition wherein a low engine output suffices; and (v) calculating a value of the delivery quantity of said compressor required for bringing said compartment temperature into said predetermined range irrespective of said sensed operating conditions of said engine and controlling the delivery quantity of said compressor to said calculated value, when said compartment temperature falls outside said predetermined range.

5. A method as claimed in claim 4, wherein said first predetermined operating condition includes an accelerating condition and a high load condition of said engine.

6. A method as claimed in claim 4, wherein said second predetermined operating condition includes a decelerating condition of said engine.

7. A method as claimed in claim 4, further including the step of calculating a value of the delivery quantity of said compressor required for maintaining said compartment temperature within said predetermined range irrespective of said sensed operating conditions of said engine and controlling the delivery quantity of said compressor to said calculated valve, when said engine is in said third operating condition other than said first and second predetermined operating conditions while said compartment temperature lies within said predetermined range.

* * * * *